US012748613B2

(12) United States Patent
Bandi et al.

(10) Patent No.: US 12,748,613 B2
(45) Date of Patent: Sep. 29, 2026

(54) PROVISIONING IMAGES TO DEPLOY CONTAINERIZED WORKLOADS IN A VIRTUALIZED ENVIRONMENT

(71) Applicant: VMware LLC, Palo Alto, CA (US)

(72) Inventors: Krishna Chaitanya Bandi, Pflugerville, TX (US); Rohith Jagannathan, Palo Alto, CA (US); Adrian Drzewiecki, Mountain View, CA (US); Abhishek Srivastava, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 721 days.

(21) Appl. No.: 18/101,939

(22) Filed: Jan. 26, 2023

(65) Prior Publication Data

US 2024/0256315 A1 Aug. 1, 2024

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ......... G06F 9/45558; G06F 2009/4557; G06F 2009/45583
See application file for complete search history.

(56) References Cited

U.S. PATENT DOCUMENTS

| | | | | |
|---|---|---|---|---|
| 10,831,474 | B2 | 11/2020 | Azagury et al. | |
| 10,884,725 | B2 | 1/2021 | Nyamars | |
| 10,929,117 | B2 | 2/2021 | Goldmann et al. | |
| 2016/0048408 | A1* | 2/2016 | Madhu | H04L 47/783 718/1 |
| 2020/0142801 | A1 | 5/2020 | Huang et al. | |
| 2021/0232418 | A1* | 7/2021 | Corrie | G06F 8/61 |
| 2021/0240671 | A1 | 8/2021 | Fong et al. | |
| 2021/0311764 | A1* | 10/2021 | Rosoff | G06F 9/44505 |

OTHER PUBLICATIONS

StackOverFlow, How to create a new container from container?, May 28, 2013, https://stackoverflow.com/questions/16781434/how-to-create-a-new-container-from-container?rq=4 (Year: 2013).*

(Continued)

*Primary Examiner* — Wei Y Mui
(74) *Attorney, Agent, or Firm* — Kim & Stewart LLP

(57) ABSTRACT

A method for provisioning images to deploy containerized workloads in a virtualized environment can include bringing up a containerized workload in a virtualized computing environment responsive to receiving a request to run a containerized workload in the virtualized computing environment. Bringing up the containerized workload can include creating a VMDK that includes a container image in shared storage of an image registry responsive to authenticating with the image registry, attaching the VMDK to a virtual computing instance, responsive to receiving a request, made by a container running in the VCI, for a file of the container image in the attached VMDK, retrieving the file from the shared storage, and bringing up the containerized workload using the file.

20 Claims, 5 Drawing Sheets

(56) References Cited

OTHER PUBLICATIONS

Serverfault, Hyper-V how to connect compressed NTFS storage or convert it, Nov. 7, 2019, https://serverfault.com/questions/783548/hyper-v-how-to-connect-compressed-ntfs-storage-or-convert-it (Year: 2019).*
Scrivano et al., Pull container images faster with partial pulls, Nov. 12, 2021, https://web.archive.org/web/20241109222726/https://www.redhat.com/en/blog/faster-container-image-pulls (Year: 2021).*
Amir Mustafa, Episode 6. Docker images are read-only, understanding layers, Feb. 20, 2022, https://amirmustafaofficial.medium.com/episode-6-images-are-read-only-understanding-layers-44e73fde6f02 (Year: 2022).*
AWS, Introducing Seekable OCI for lazy loading container images, Sep. 8, 2022, https://aws.amazon.com/about-aws/whats-new/2022/09/introducing-seekable-oci-lazy-loading-container-images/#:~: text=Lazy%20loading%20is%20an%20approach, files%20from%20gzipped%20tar%20files (Year: 2022).*
Deng, Deconstructing Network Attached Storage Systems, 2009, Yuhui Deng, Deconstructing Network Attached Storage systems, Journal of Network and Computer Applications, vol. 32, Issue 5, 2009, pp. 1064-1072, ISSN 1084-8045, https://doi.org/10.1016/j.jnca.2009.02.006. (Year: 2009).*
StackExchange, Create Archive of complete drive with tar, Dec. 24, 2019, https://unix.stackexchange.com/questions/558790/create-archive-of-complete-drive-with-tar (Year: 2019).*
European Patent Office, Extended Search Report, Application No. 24153956.8, Jun. 26, 2024, 9 pages.

* cited by examiner

PROVISIONING IMAGES TO DEPLOY CONTAINERIZED WORKLOADS IN A VIRTUALIZED ENVIRONMENT

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
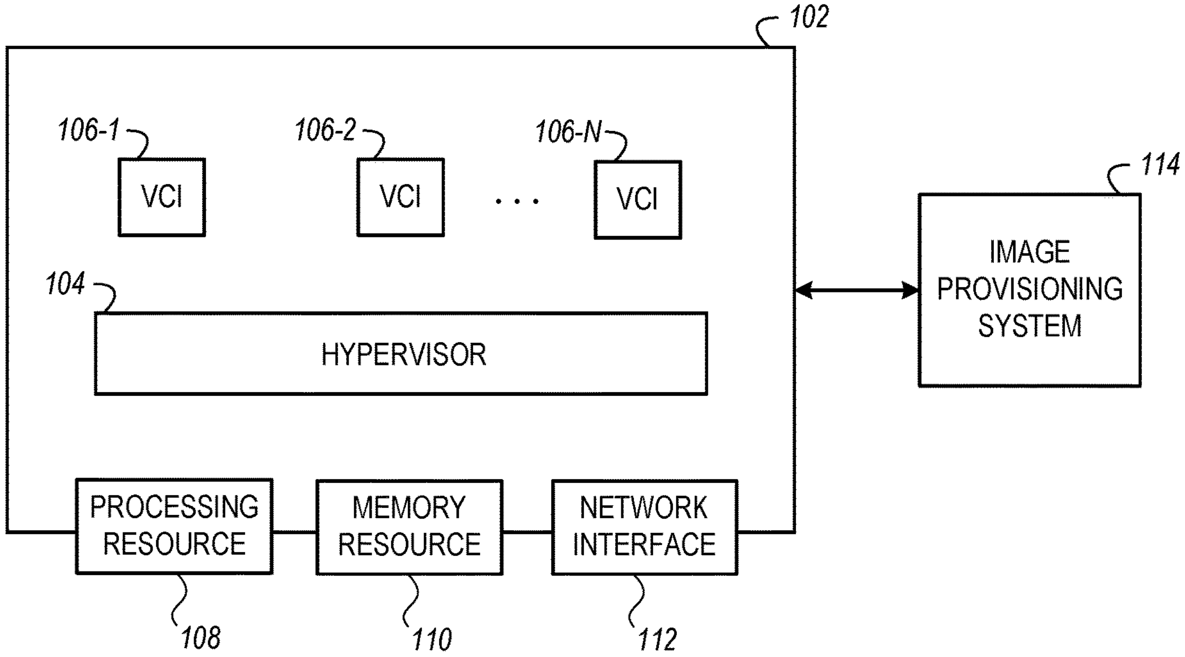
FIG. 1 is a diagram of a host for provisioning images to deploy containerized workloads in a virtualized environment according to the present disclosure.

The term "virtual computing instance" (VCI) covers a range of computing functionality. VCIs may include data compute nodes such as virtual machines (VMs). Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more "lightweight" than VMs at least because they share an operating system rather than operating with their own guest operating system.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

Containerized cloud-native applications can be used to accelerate application delivery in software defined data centers. As used herein, "containerized" or "containerization" refers to a virtualization technique in which an application (or portions of an application, such as flows corresponding to the application) are encapsulated into a container (e.g., Docker, Linux containers, etc.) as an alternative to full machine virtualization. Because containerization can include loading the application on to a VCI, the application may be run on any suitable physical machine without worrying about application dependencies. Further, as used herein, "cloud-native applications" refer to applications (e.g., computer programs, software packages, etc.) that are assembled as containerized workloads (e.g., microservices) in containers deployed in a software defined data center. "Containerized workloads" or "microservices" refer to a computing architecture in which an application is structured as a collection of loosely coupled (e.g., containerized) services. Containerized workload architectures may allow for improved application modularity, scalability, and continuous deployment in comparison to traditional application development environments.

In order to take advantage of the perceived benefits of containerized cloud-native applications, container schedulers such as KUBERNETES®, DOCKER SWARM®, MESOS®, etc. can be used to deploy and/or manage containerized applications. Container schedulers can consider parameters associated with the software defined data center on which they operate to deploy and/or manage the containerized applications. In some approaches, the parameters considered by the container scheduler can include host VCI resources (e.g., host VCI processing resources and/or memory resources), host VCI processing resource and/or memory resource utilization, and/or policy-based affinity rules (e.g., policy-based rules that can control the placement of VCIs and/or containers on host machines within a virtual cluster) as part of scheduling deployment and/or managing containers.

To run a containerized workload in modern virtualized workload-management solutions, a container image is first downloaded from an image registry to make the contents of the image available. In previous approaches, the image is typically downloaded in a compressed format and thus needs to be uncompressed and then extracted to create the root file system layout of the image before starting the container program from its file system. Downloading and extracting the entire container image can take an undesirable amount of time (e.g., several minutes) depending on its size and the network bandwidth. This delay results in an undesirable delay in container bring up time.

As referred to herein "container bring up" is the process of causing a container to reach a running state. In some cases, bringing up a container may be understood to mean starting up a container. Bringing up a container may also refer to bringing up a container process. Container-based workloads are becoming increasingly ubiquitous (e.g., on VSPHERE® since it evolved to be a native KUBERNETES® platform). Reduced bring up time for containers allows faster scale up of workloads, which reduces downtime and provides a better experience for customers.

Embodiments of the present disclosure can bring up containers faster than previous approaches by not waiting for container images to be downloaded and extracted in their entirety prior to container bring up. As will be described in more detail below, embodiments herein can store container images in a format that the VCI running the workload "understands" (e.g., recognizes and/or is compatible with) and can make container images accessible to the underlying hosts by storing them on local or network-based storage. For example, container images can be stored in a well-known format (e.g., tar) and have them be attached as a disk to the VCI that is to run the container. The VCI's file system can understand the tar format and can therefore look up and read contents of the image on a need-to basis. The underlying host is given access to the container images stored in the well-known format in an embedded registry. When a container is to be brought up, the host control plane component looks up the container image and attaches the disk to the VCI that is to run the container. The VCI control plane component mounts the disk representing the image, making image contents available to launch the container program via the custom file system.

Project Pacific is a re-architecture of vSphere with Kubernetes as its control plane. Leveraging Kubernetes as the control plane enables developers and IT operators to build and manage apps comprised of containers and/or VCIs and allows enterprises to leverage a single platform to operate existing and modern apps side-by-side.

The Supervisor Cluster on vSphere is a Kubernetes cluster that uses ESXi nodes as its worker nodes. Kubernetes pods deployed on a Supervisor Cluster run in isolated VCIs referred to as "PodVMs." A PodVM is based out of a container runtime on ESXi referred to as "CRX" that has a Linux kernel and only the bare-minimum utilities and libraries in the guest. Each ESXi worker node runs a node agent referred to as "Spherelet Agent" that runs on each PodVM that acts as a control plane for the PodVM inside the guest and runs the container runtime engine.

As used herein, designators such as "N," "M," "X," "Y," "Z," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2. A group or plurality of similar elements or components may generally be referred to herein with a single element number. For example, a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments and should not be taken in a limiting sense.

Embodiments of the present disclosure are directed to container bringup, for example, in the context of a software defined data center (e.g., a distributed computing environment) including one or more hypervisors, VCIs and/or containers. As described above, "containerized workloads" (e.g., microservices) refer to containerized instructions that correspond to portions of an application and are structured as a collection of loosely coupled (e.g., containerized) services. Containerized workloads can be created using different coding languages (e.g., as part of a polyglot approach to application deployment). For example, in a containerized workload or microservice architecture, an application can be divided into multiple modular services that can be deployed on containers. The containerized workloads can run fine-grained services, and the containers can have short lifespans. As used herein, "fine-grained services" refer to services that make direct use of resources that are granted direct access by one or more application programming interfaces (APIs). In contrast, "coarse-grained services" include services that utilize multiple fine-grained services. Further, as used herein, a "short lifespan" refers to a container that is destroyed after a short period of time (e.g., seconds to minutes), as compared to "long lifespan" containers, which operate for minutes or more before being destroyed. In some embodiments, short lifespan containers are containers that run containerized workloads, which are generally destroyed after a relatively short period of time once the containerized workload has been executed and consumed by an application.

FIG. 1 is a diagram of a host 102 for provisioning images to deploy containerized workloads in a virtualized environment according to the present disclosure. The host 102 can be provisioned with processing resource(s) 108 (e.g., one or more processors), memory resource(s) 110 (e.g., one or more main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs 106 can be local and/or remote to the host 102 (e.g., the VCIs 106 can be ultimately executed by hardware that may not be physically tied to the VCIs 106). For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, the host 102 can be connected to (e.g., in communication with) an image provisioning system 114, which can be deployed on a VCI 106.

The VCIs 106-1, . . . , 106-N can include one or more containers (e.g., containers 220 illustrated in FIG. 2, herein), which can have a containerized workload (e.g., the containerized workloads 222 illustrated in FIG. 2, herein), such as a microservice, running thereon. The containerized workloads can correspond to one or more applications or portions of applications executed by the VCIs 106 and/or the host 102. The application may be configured to perform certain tasks and/or functions for the VCIs 106 and/or the host 102. By executing the application using multiple containerized workloads, scalability and/or portability of applications may be improved in comparison to approaches in which applications are monolithic.

Figure 2:
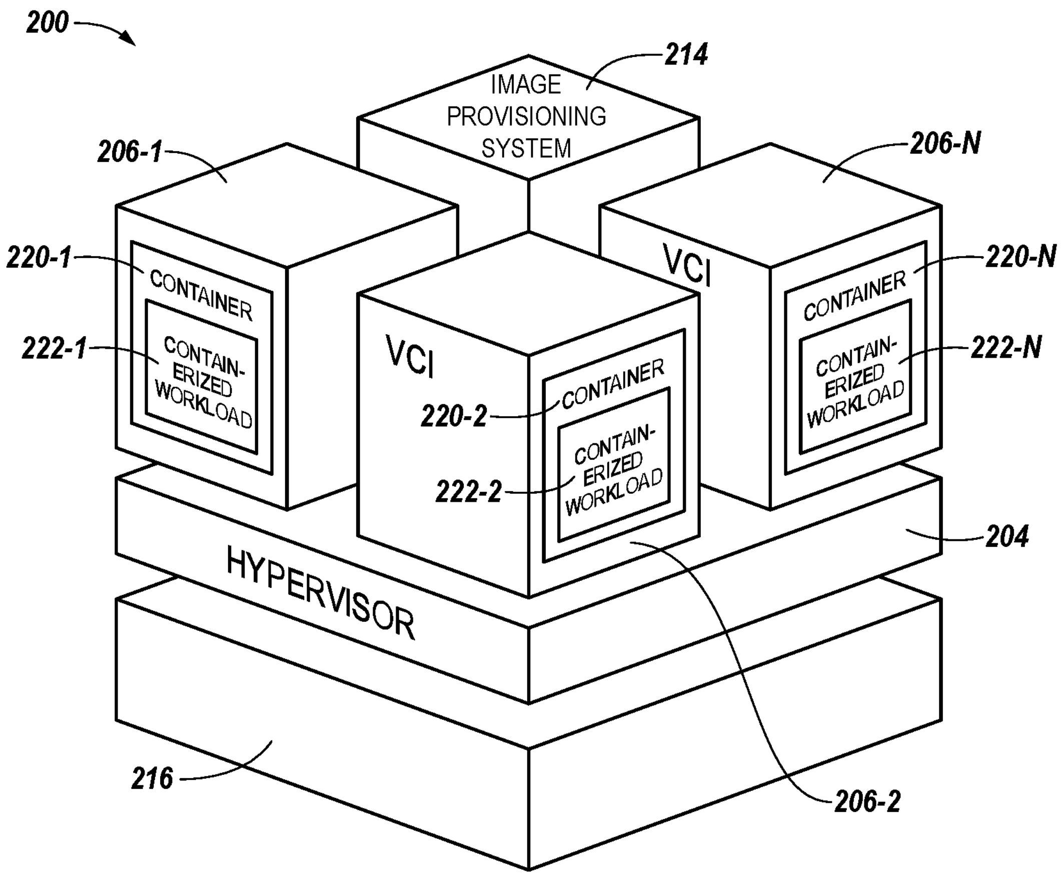
FIG. 2 is a diagram of a simplified system for provisioning images to deploy containerized workloads in a virtualized environment according to a number of embodiments of the present disclosure.

FIG. 2 is a diagram of a simplified system 200 for provisioning images to deploy containerized workloads in a virtualized environment according to a number of embodiments of the present disclosure. The system 200 can include a pool of computing resources 216, a plurality of VCIs 206-1, 206-2, . . . , 206-N, an image provisioning system 214, and/or a hypervisor 204. The image provisioning system 214 can, in some embodiments, be analogous to the image provisioning system 114 illustrated in FIG. 1, herein.

The system 200 can include additional or fewer components than illustrated to perform the various functions described herein. In some embodiments, the VCIs 206-1, 206-2, . . . , 206-N, and/or the image provisioning system 214 can be deployed on the hypervisor 204 and can be provisioned with the pool of computing resources 216. However, embodiments are not so limited and, in some embodiments, the image provisioning system 214 can be deployed on one or more VCIs, for example, as a distributed agent.

The pool of computing resources 216 can include physical computing resources used in a software defined data center, for example, compute, storage, and network physical resources such as processors, memory, and network appliances. The VCIs 206-1, 206-2, . . . , 206-N, can be provisioned with computing resources to enable functionality of the VCIs 206-1, 206-2, . . . , 206-N. In some embodiments, the system 200 can include a combination of hardware and program instructions that are configured to provision the VCIs 206-1, 206-2, . . . , 206-N using the pool of computing resources 216 in the software defined data center. In some embodiments, the image provisioning system 214 can cause the containers 220-1, . . . , 220-N to be brought up and/or deployed on the VCIs 206.

Project Pacific is a re-architecture of vSphere with Kubernetes as its control plane. Leveraging Kubernetes as the control plane enables developers and IT operators to build and manage apps comprised of containers and/or VCIs and allows enterprises to leverage a single platform to operate existing and modern apps side-by-side.

The Supervisor Cluster on vSphere is a Kubernetes cluster that uses ESXi nodes as its worker nodes. Kubernetes pods deployed on a Supervisor Cluster run in isolated VCIs referred to as "PodVMs." A PodVM is based out of a container runtime on ESXi referred to as "CRX" that has a Linux kernel and only the bare-minimum utilities and libraries in the guest. Each ESXi worker node runs an node agent referred to as "Spherelet Agent" that runs on each PodVM that acts as a control plane for the PodVM inside the guest and runs the container runtime engine.

When a pod is created in a Kubernetes cluster, it starts in a pending phase. It is first scheduled onto one of the worker nodes in the cluster. Networking is set up for the pod to get an IP address of its own and the volumes indicated by the pod specification are set up. Images used by the pod containers are pulled from the image registry and prepared for the container runtime to start containers, which transitions the pod to a running state.

Figure 3:
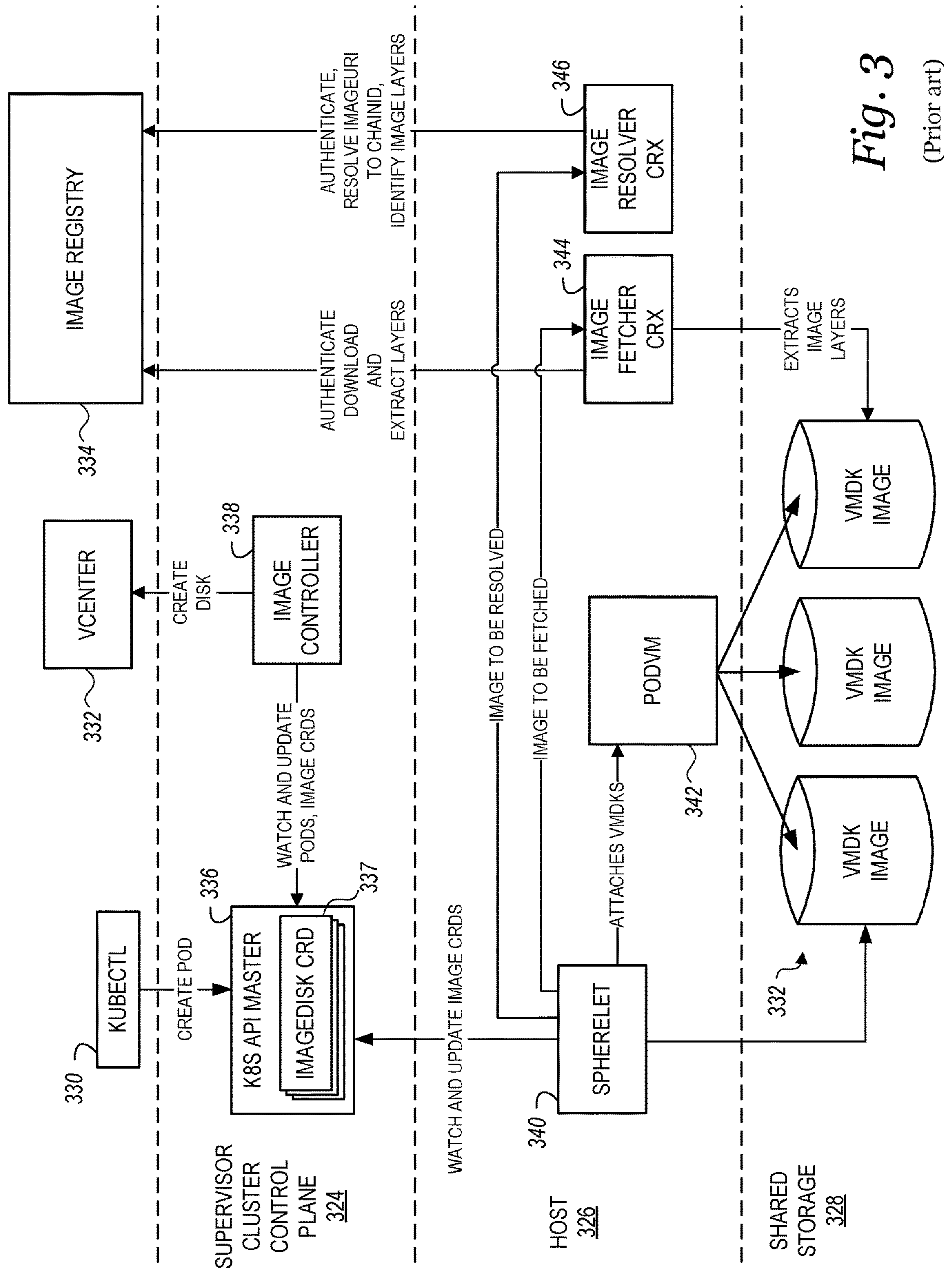
Fig. 3 (Prior art)
FIG. 3 illustrates an existing image service architecture for servicing images in a supervisor cluster.

FIG. 3 illustrates an existing image service architecture for servicing images in a supervisor cluster. A newly created pod in a supervisor cluster 324 is scheduled to an ESXi node 326 by the native k8s scheduler and the vSphere Distributed Resource Scheduler (DRS) based on the policies indicated by the pod specification and resource usage in the cluster. The pod specification can be specified by a command line tool, for instance (e.g., kubectl 330, illustrated in FIG. 3). A PodVM 342 is created and powered-on on the selected node for the pod. If the pod uses any persistent volumes, the Cloud Native Storage (CNS) controller creates and attaches volumes backed by VMDKs 322 in shared storage 328 as first class disks to the PodVM 342. These volumes are mounted by the Spherelet 340 in the PodVM 342 for the containers to use. The Spherelet (e.g., Spherelet agent) 340 is based on the Kubernetes "Kubelet" and enables an ESXi hypervisor to ct as a Kubernetes worker node. The Spherelet 340 is an ESXi UserWorld aagent that acts as an extension to the Kubernetes Control Plane. Its primary function is to poll the Kubernetes Control Plane's API server for changes made to pod configuration, volumes, services, configmaps and secrets and then carry out the necessary operations to ensure that these are instantiated. Each of the images used by the containers in the pod need to be pulled from an image registry 334 in the shared storage, extracted layer-by-layer and then mounted for starting the containers within PodVM 342. In previous approaches, this job is distributed across multiple components in the supervisor cluster and is somewhat complex.

The image controller 338 running with the k8s API server 336 watches for new pods being created in the cluster. For each image used by a new pod, it creates empty image related custom resource definitions (CRDs) 337 that capture details like the image size, chain ID, information about the layers in the image, and track the state of an image. The image controller 338 also creates a first class disk for the image if it does not already exist and updates the image CRDs 337 with the corresponding disk information. The size of the disk is determined by the combined size of all the image layers obtained from the image registry 334. It is noted that the same image disk can be used by multiple pods using the same image.

Spherelet 340 watches image-related CRDs 337 and uses image secrets to normalize the image URL and obtain image layers metadata and populate the CRDs 337 with that information to be later extracted. For this, Spherelet 340 uses special purpose system VMs including one or more image resolvers 346 and one or more image fetchers 344. The image resolver(s) 346 and image fetcher(s) 344 are system CRX VMs used to quickly get a Linux runtime on ESXi and craft a container image root filesystem. An image fetcher VM 344, created dynamically with the image disk attached to it, formats the disk volume, downloads the image layers, and extracts them layer-by layer onto the volume to create the container root file system. The image disk is then ready to be used by the PodVM 342 and its CRD is updated accordingly. Spherelet 340 then attaches the image disk to the PodVM 342, which is then mounted by the Spherelet agent in the PodVM 342. The Spherelet agent in the PodVM 342 starts the containers from the root file system. If a container in a new pod uses the same image, the existing image disk is re-used and the image fetcher(s) 344 are not involved.

Previous approaches encounter at least two problematic issues. First, downloading the image layers onto the image disk takes time, the length of which depends on the size of the image and the internet bandwidth. In spite of the fact that less than all the layers may be needed to run one or more programs from the image for the container, all the layers are downloaded and extracted before running the container. Second, the Spherelet 340 reserves VCIs on the host to run the image fetcher VCI(s) 344. Each of these VCIs take up memory resources (e.g., 160 MB per host) and consume CPU to set up images used for pods. A host can have one or more such VCIs depending on the size of the host.

In previous approaches, Kubernetes only has a sense of three states: running, not running, and not scheduled. It does not optimize well for cases where a node with capacity is waiting to handle a request, referred to as a "cold start." Cold start is affected by image pull latency and any current extensions, such as pre-warming the node with base images does not prevent these nodes from spending multiple seconds to pull gigabytes of image data. Embodiments herein can reduce (e.g., minimize) image pull latency by preparing the container image root file system without needing to download all the layers of the container and without using image fetcher VCIs.

Some previous approaches have an image streaming feature that works by mounting the container data layer in containers using a sophisticated network mount, and backing it with multiple caching layers on the network, in-memory and on-disk. A container transitions from an "imagepulling" status to "running" in a reasonably short period of time (e.g., a few seconds), regardless of container size once the image streaming mount is prepared. The present disclosure applies in contexts where each pod runs on its own PodVM and ESXi acts as a Kubernetes worker node. An example of such a context is vSphere Supervisor Cluster.

Figure 4:
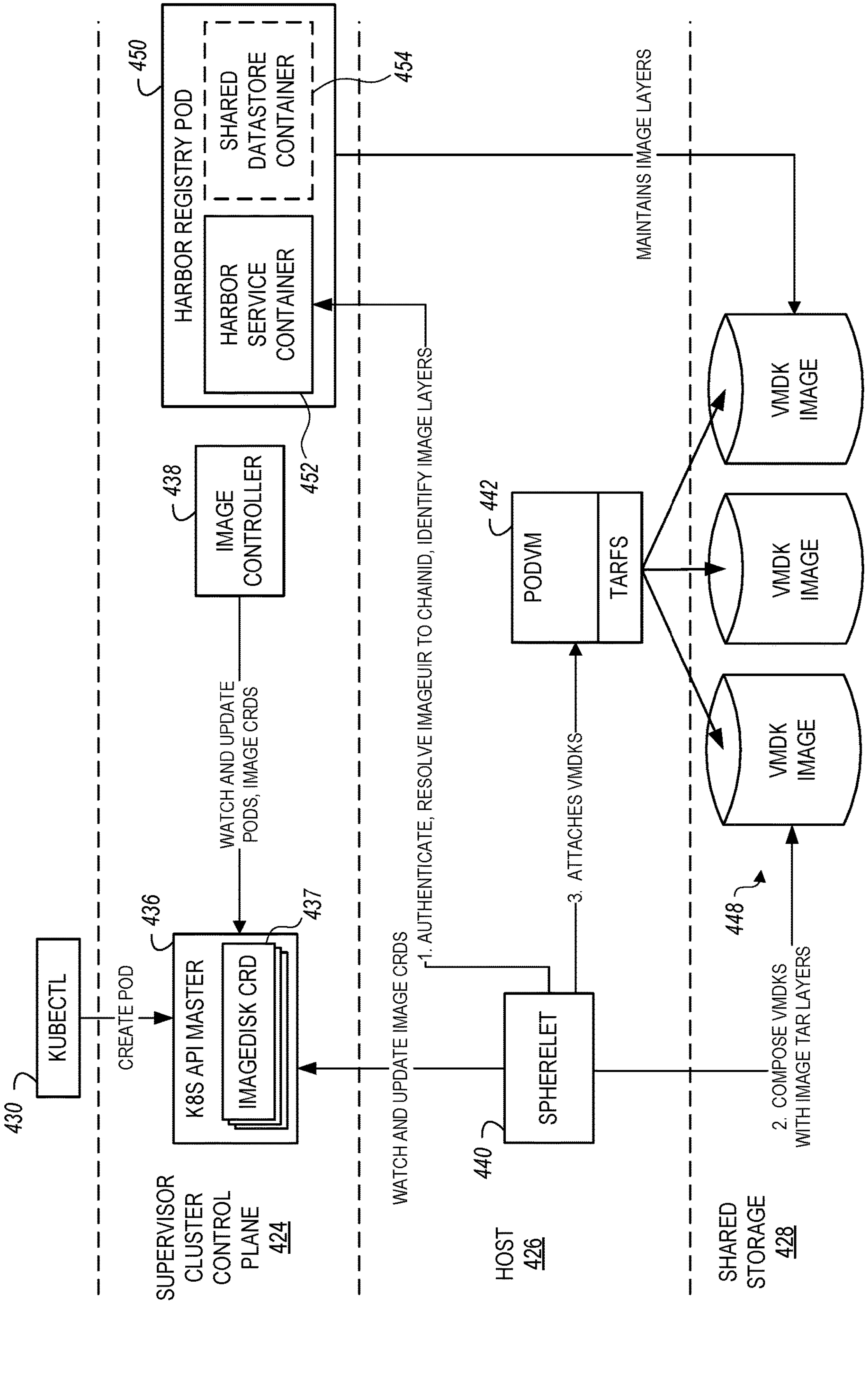
FIG. 4 illustrates an image service architecture for servicing images in a supervisor cluster according to a number of embodiments of the present disclosure.

FIG. 4 illustrates an image service architecture for servicing images in a supervisor cluster according to a number of embodiments of the present disclosure. In some embodiments, the embedded Harbor Image Registry (illustrated in FIG. 4 as "Harbor Service Container") 452 in a Harbor Registry Pod 450 of a Supervisor Cluster 424 provides images in a way that can be consumed from within PodVMs directly; the images should not have to be downloaded onto the PodVM or be extracted fully to run containers from them. First, image layers are made available to the ESXi worker nodes 426 directly from the image registry 452 by setting up a shared storage, such as NFS or vSAN. Then, the layers are provided to PodVM by means of VMDKs 448 that have the layers as their backing. Accordingly, the architecture illustrated in FIG. 4 can be distinguished from the architecture illustrated in FIG. 3 in a number of manners.

Embodiments of the present disclosure differ from approaches that use the architecture illustrated in FIG. 3, broadly speaking, in the image format, the image registry 452, the duties of the image resolver and image fetcher, and caching, among others. In contrast with previous approaches, such as that illustrated in FIG. 3, embodiments herein can store images in an uncompressed format (e.g., tar). Additionally, the image registry 452 stores the uncompressed images on a shared storage that is accessible to the ESXi worker nodes. The image resolver CRX component (346 in FIG. 3) can be eliminated and its task(s) performed instead by the Spherelet 440. Additionally, images are made available to the PodVM 442 by attaching VMDKs that are backed by the corresponding image files from the shared storage in the image registry 452 and thus the image fetcher 344 illustrated in FIG. 3 can be eliminated as well. Additionally, caching is provided by the shared storage client.

With respect to the image format, previous approaches store image layers in the image registry in a compressed format (e.g., tar.gz). Embodiments herein can store image layers in an uncompressed format (e.g., tar). Storing image layers in an uncompressed format allows the PodVM to access the images directly from the shared datastore of the registry 452 rather than having to decompress them. Although storing in an uncompressed format uses disk space less efficiently than storing in a compressed format, it trades faster pod boot time for the additional space on the disk.

One example option to minimize additional disk space is to employ block level compression. This technique may involve all reads being decompressed and all writes to be compressed when reading and writing respectively from the file system. These compressions and decompressions happen between file system and disk, thus allowing to trade CPU cycles for disk capacity savings. Block level compression is currently supported in vSAN and has shown to provide a peak performance of up to 58% on database workloads when using a compression-only technique. An alternate example is to keep image layers in a compressed format, but decompress the layers in the registry 452 when used. This task can be handled by an additional Shared Datastore Container 454 by collaborating with Harbor Service Container 452 when a specific image layer is requested. This mechanism trades in additional processing time for saving disk space based on the premise that in general only a few of the image layers are used concurrently.

The image registry 452 is a storage and content delivery system for Open Container Initiative (OCI) images. In accordance with the present disclosure, the image registry 452 in addition is also a form of shared storage that allows ESXi worker nodes to access images directly from it. Examples of such shared storage are vSAN or NFS. In the example of NFS, to access shared storage via NFS from an ESXi host, the image registry host runs NFS server and ESXi host runs NFS client. ESXi should be notified about the path and IP address of the NFS server in the image registry 452. This can be supplied to the Spherelet 440 as configuration. The Spherelet 440 can then use this information to access the image registry 452.

With respect to the image resolver, in previous approaches, image resolution is performed in the supervisor cluster by image resolver CRX (previously described in connection with FIG. 3). The image resolver CRX instance is passed the necessary credentials to connect to the image registry 452. The image registry 452 takes image URI and returns the chainID, which is a unique reference to all the layers required for the image along with the uncompressed size of each of the layers. In accordance with the present disclosure, the Spherelet 440 performs the task of the image resolver CRX instance and resolves the image URI to retrieve chainID and uncompressed size of all layers. Similar to supervisor cluster, the output of the image resolver is written into image object CRD 437 of a k8s API master 436 as annotation. The supervisor cluster offloads the image resolving task to a separate CRX instance as it is on an NSX-T configured network to be able to access public registries. Spherelet 440 is on a management network and cannot access the public registry. It can be assumed that the shared storage 428 is accessible on the management network and thus Spherelet 440 can handle image resolution.

With respect to the PodVM and image fetcher, previously described in connection with FIG. 3, for a new image to be created in a supervisor cluster, a VMDK of the appropriate size is created first by the control plane 324. The Spherelet 340 launches the image resolver VM 346 and image fetcher VM 344 to resolve, fetch, and extract the images onto the VMDK. The VMDK is then attached to the PodVM 342. In accordance with the present disclosure, when a new image is to be created, the Spherelet 440 authenticates with the image registry 452 and obtains information about the images, such as the image layers, their sizes, etc. A VMDK is then created with one extent per image layer with respective sizes and appropriate paths for each layer from the shared datastore 428. The Spherelet 440 configures this VMDK to be an NFS-backed disk and attaches the NFS-backed disk to the PodVM 442. The VMDK can be re-used for other pods using the same image.

The format backing the image within VMDK is tarfs and is currently empty. Tarfs is a filesystem for tar files and is supported by tarfs Photon kernel module in the PodVM 442. The layers are loopback mounted to present a single root filesystem layout for the container. When a container running within PodVM 442 tries to access any file that is part of the image in the attached VMDK, the NFS client on ESXi hosting the PodVM retrieves the file from NFS shared storage residing in the image registry 452 on demand. Thus, in accordance with the present disclosure, image fetcher VMs in the Supervisor Cluster can be eliminated and embodiments herein allow the PodVM 442 to start running the container much earlier than in traditional Supervisor Cluster architectures.

With respect to caching, previous approaches may rely heavily on caching images in the caching layer by sharing image disks across pods that have common images. This may be helpful in limiting the number of pulls from the image registry 452 as the image disks are shared between ESXi worker nodes. In accordance with the present disclosure, however, since the image registry 452 is available to the hosts via shared storage, such as NFS, the clients of the shared storage on each node can provide caching such that if a previously accessed image layer is accessed again on the ESXi worker node, it is served from the cache instead of reaching the remote storage.

In some embodiments, security can be provided by exposing image layers as read-only by the shared storage so that a rogue agent on ESXi worker nodes does not corrupt the image layers. Writes performed by a container to the root file system of the image do not go to the underlying VMDK or layer in the shared datastore but to a writable layer within the PodVM 442 itself.

Figure 5:
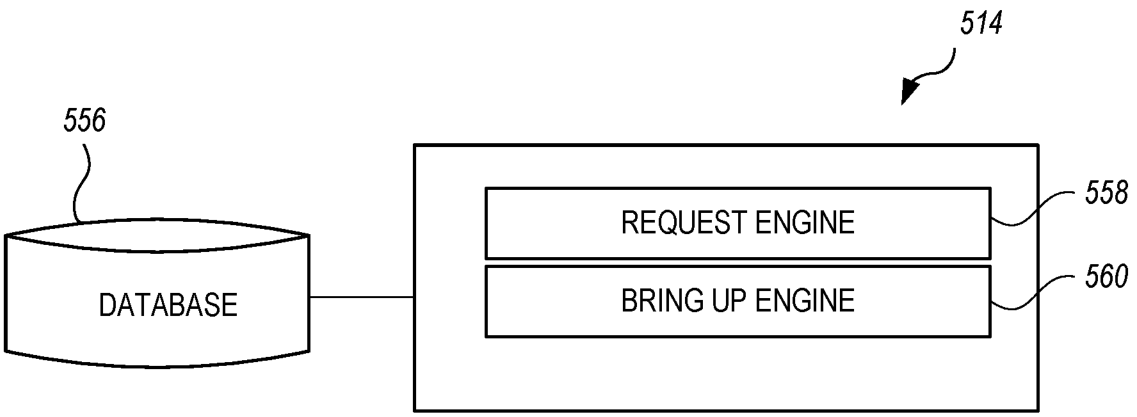
FIG. 5 is a diagram of a system for provisioning images to deploy containerized workloads in a virtualized environment according to one or more embodiments of the present disclosure.

FIG. 5 is a diagram of a system for provisioning images to deploy containerized workloads in a virtualized environment according to one or more embodiments of the present disclosure. The system 514 can include a database 556 and/or a number of engines, for example request engine 558 and/or bring up engine 560, and can be in communication with the database 556 via a communication link. The system 514 can include additional or fewer engines than illustrated to perform the various functions described herein. The system can represent program instructions and/or hardware of a machine (e.g., machine 662 as referenced in FIG. 6, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the request engine 558 can include a combination of hardware and program instructions that is configured to receive a request to run a containerized workload in a virtualized computing environment. In some embodiments, the bring up engine 560 can include a combination of hardware and program instructions that is configured to bring up the containerized workload. Bringing up the containerized workload can include, for example, creating a virtual machine disk (VMDK) that includes a container image in shared storage of an image registry responsive to authenticating with the image registry. Bringing up the containerized workload can include, for example, attaching the VMDK to a virtual computing instance (VCI). Bringing up the containerized workload can include, for example, retrieving the file from the shared storage responsive to receiving a request, made by a container running in the VCI, for a file of the container image in the attached VMDK. Bringing up the containerized workload can include, for example, bringing up the containerized workload using the file.

Figure 6:
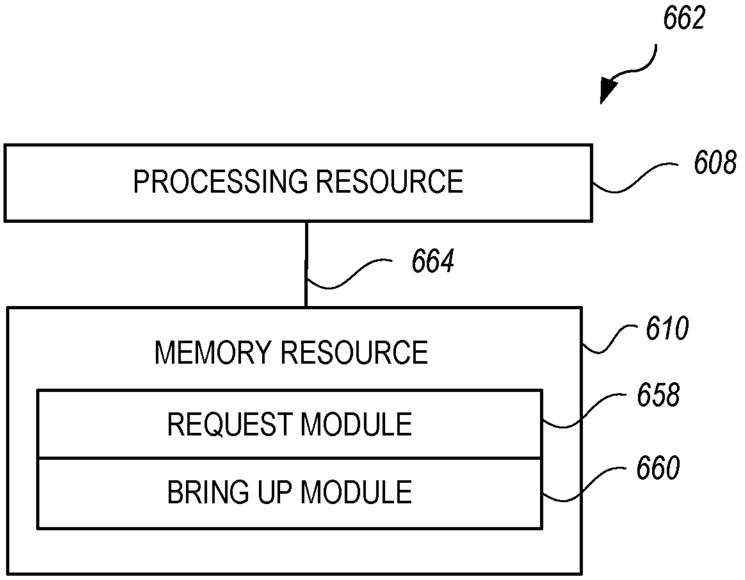
FIG. 6 is a diagram of a machine for provisioning images to deploy containerized workloads in a virtualized environment according to one or more embodiments of the present disclosure.

FIG. 6 is a diagram of a machine for provisioning images to deploy containerized workloads in a virtualized environment according to one or more embodiments of the present disclosure. The machine 662 can utilize software, hardware, firmware, and/or logic to perform a number of functions. The machine 662 can be a combination of hardware and program instructions configured to perform a number of functions (e.g., actions). The hardware, for example, can include a number of processing resources 608 and a number of memory resources 610, such as a machine-readable medium (MRM) or other memory resources 610. The memory resources 610 can be internal and/or external to the machine 662 (e.g., the machine 662 can include internal memory resources and have access to external memory resources). In some embodiments, the machine 662 can be a virtual computing instance (VCI). The program instructions (e.g., machine-readable instructions (MRI)) can include instructions stored on the MRM to implement a particular function (e.g., an action such as configuring a certificate, as described herein). The set of MRI can be executable by one or more of the processing resources 608. The memory resources 610 can be coupled to the machine 662 in a wired and/or wireless manner. For example, the memory resources 610 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 610 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 608 can be coupled to the memory resources 610 via a communication path 664. The communication path 664 can be local or remote to the machine 662. Examples of a local communication path 664 can include an electronic bus internal to a machine, where the memory resources 610 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 664 can be such that the memory resources 610 are remote from the processing resources 608, such as in a network connection between the memory resources 610 and the processing resources 608. That is, the communication path 664 can be a network connection. Examples of such a network connection can include a local area network (LAN), wide area network (WAN), personal area network (PAN), and the Internet, among others.

As shown in FIG. 6, the MRI stored in the memory resources 610 can be segmented into a number of modules 658, 660 that when executed by the processing resources 608 can perform a number of functions. As used herein a module includes a set of instructions included to perform a particular task or action. The number of modules 658, 660 can be sub-modules of other modules. For example, the bring up module 660 can be a sub-module of the request module 658 and/or can be contained within a single module. Furthermore, the number of modules 658, 660 can comprise individual modules separate and distinct from one another. Examples are not limited to the specific modules 658, 660 illustrated in FIG. 6.

Each of the number of modules 658, 660 can include program instructions and/or a combination of hardware and program instructions that, when executed by a processing resource 608, can function as a corresponding engine as described with respect to FIG. 5. For example, the request module 658 can include program instructions and/or a combination of hardware and program instructions that, when executed by a processing resource 608, can function as the request engine 558, though embodiments of the present disclosure are not so limited.

The machine 662 can include a request module 658, which can include instructions to receive a request to run a containerized workload in a virtualized computing environment. The machine 662 can include a bring up module 660, which can include instructions to bring up the containerized workload, wherein bringing up the containerized workload includes creating a virtual machine disk (VMDK) that includes a container image in shared storage of an image registry responsive to authenticating with the image registry, attaching the VMDK to a virtual computing instance (VCI), responsive to receiving a request, made by a container running in the VCI, for a file of the container image in the attached VMDK, retrieving the file from the shared storage, and bringing up the containerized workload using the file.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for provisioning container images for containerized workloads in a virtualized computing environment, said method comprising:

bringing up a containerized workload in a virtual computing instance (VCI) executing in one of a plurality of host computers of the virtualized computing environment responsive to receiving a request to run the containerized workload in the virtualized computing environment, wherein bringing up the containerized workload includes:

creating, upon authenticating with an image registry, a virtual machine disk (VMDK) that includes references to layers of a container image of the container images, the referenced layers of the container image being stored externally from the VMDK in shared storage accessible to the plurality of host computers;

attaching, to the VCI, the VMDK having the references to the layers of the container image stored externally from the VMDK;

mounting, in the VCI, a filesystem derived from the layers of the container image and exposed via the attached VMDK, to enable on-demand access to files of the container image stored externally from the VMDK; and responsive to a request made by a container for the containerized workload running in the VCI, for a file of the container image referenced by the mounted filesystem, retrieving the file from the shared storage, the containerized workload then accessing the retrieved file via the mounted filesystem.

2. The method of claim 1, further comprising:

storing the container image in the shared storage in an uncompressed format, wherein the VMDK when attached references the layers of the container image in the uncompressed format.

3. The method of claim 2, wherein the container image is stored in the shared storage in a tar format.

4. The method of claim 1, wherein the shared storage is a network file system (NFS) shared storage.

5. The method of claim 4, wherein an NFS client running on the one of the host computers retrieves the file from the shared storage.

6. The method of claim 1, further comprising:

receiving information about the container image responsive to authenticating with the image registry.

7. The method of claim 6, wherein the information about the container image includes information relating to each of the layers of the container image and further includes information identifying an uncompressed size of all the layers of the container image.

8. The method of claim 7, wherein the VMDK is created with extents that are respectively associated with the layers of the container image, the extents including sizes of and the references to the layers of the container image.

9. The method of claim 1, further comprising:

attaching, to another VCI of the virtualized computing environment, the VMDK having the references to the layers of the container image stored externally from the VMDK; and mounting, in the other VCI, a filesystem derived from the layers of the container image and exposed via the VMDK attached to the other VCI, to enable on-demand access to the files of the container image stored externally from the VMDK.

10. A non-transitory, machine-readable medium having instructions stored thereon which, when executed by a processor of a host computer of a plurality of host computers in a virtualized computing environment, cause the processor to:

bring up a containerized workload in a virtual computing instance (VCI) executing in the host computer responsive to receiving a request to run the containerized workload in the virtualized computing environment, wherein bringing up the containerized workload includes:

creating, upon authenticating with an image registry, a virtual machine disk (VMDK) that includes references to layers of a container image, the referenced layers of the container image being stored externally from the VMDK in shared storage accessible to the plurality of host computers of the virtualized computing environment;

attaching, to the VCI, the VMDK having the references to the layers of the container image stored externally from the VMDK;

mounting, in the VCI, a filesystem derived from the layers of the container image and exposed via the attached VMDK, to enable on-demand access to files of the container image stored externally from the VMDK; and responsive to a request made by a container for the containerized workload running in the VCI, for a file of the container image referenced by the mounted filesystem, retrieving the file from the shared storage,; and bringing up the containerized workload then accessing the retrieved file via the mounted filesystem-using the file.

11. The non-transitory, machine-readable medium of claim 10, wherein the VCI is a pod virtual machine (PodVM) that includes an agent running a container runtime engine.

12. The non-transitory, machine-readable medium of claim 10, wherein the instructions when executed further cause the processor to:

store the container image in the shared storage in an uncompressed format, the VMDK when attached referencing the layers of the container image in the uncompressed format.

13. The non-transitory, machine-readable medium of claim 12, wherein the container image is stored in the shared storage in a tar format.

14. The non-transitory, machine-readable medium of claim 10, wherein the instructions when executed further cause the processor to:

store the container image in the shared storage in a compressed format using block level compression (BLC).

15. The non-transitory, machine-readable medium of claim 10, wherein the instructions when executed further cause the processor to:

store the container image in the shared storage in a compressed format; and decompress data from the files of the container image that are requested by the containerized workload.

16. The non-transitory, machine-readable medium of claim 10, wherein the instructions when executed further cause the processor to;

responsive to a subsequent request made by the container for the containerized workload, retrieving another file of the container image from the shared storage, the containerized workload then accessing the retrieved other file via the mounted filesystem.

17. A host computer of a virtualized computing environment, the host computer being configured to:

bring up a containerized workload in a virtual computing instance (VCI) executing in the host computer responsive to receiving a request to run the containerized workload in the virtualized computing environment, wherein bringing up the containerized workload includes:

creating, upon authenticating with an image registry, a virtual machine disk (VMDK) that includes references to layers of a container image, the referenced layers of the container image being stored externally from the VMDK in shared storage accessible to a plurality of host computers of the virtualized computing environment;

attaching, to the VCI, the VMDK having the references to the layers of the container image stored externally from the VMDK;

mounting, in the VCI, a filesystem derived from the layers of the container image and exposed via the attached VMDK, to enable on-demand access to files of the container image stored externally from the VMDK; and responsive to a request made by a container for the containerized workload running in the VCI, for a file of the container image referenced by the mounted filesystem, retrieving the file from the shared storage, containerized workload then accessing the retrieved file via the mounted filesystem.

18. The host computer of claim 17, further configured to:

store the container image in the shared storage as read-only.

19. The host computer of claim 17, further configured to;

retrieve a remainder of the container image excluding the file of the container image, from the shared storage, after bringing up the containerized workload.

20. The host computer of claim 17, further configured to:

execute as one of a plurality of worker nodes of a container scheduler of the virtualized computing environment.

* * * * *